(12) United States Patent
Wu et al.

(10) Patent No.: US 11,520,209 B2
(45) Date of Patent: Dec. 6, 2022

(54) ELECTROPHORETIC PARTICLES, MEDIA, AND DISPLAYS AND PROCESSES FOR THE PRODUCTION THEREOF

(71) Applicant: E INK CORPORATION, Billerica, MA (US)

(72) Inventors: Ziyan Wu, Wayland, MA (US); David Darrell Miller, Wakefield, MA (US)

(73) Assignee: E Ink Corporation, Billerica, MA (US)

( * ) Notice: Subject to any disclaimer, the term of this patent is extended or adjusted under 35 U.S.C. 154(b) by 87 days.

(21) Appl. No.: 16/844,544

(22) Filed: Apr. 9, 2020

(65) Prior Publication Data

US 2020/0341342 A1    Oct. 29, 2020

Related U.S. Application Data

(60) Provisional application No. 62/837,760, filed on Apr. 24, 2019.

(51) Int. Cl.
| | | |
|---|---|---|
| G02F 1/167 | (2019.01) | |
| C09C 3/06 | (2006.01) | |
| C09C 3/10 | (2006.01) | |
| G02F 1/1675 | (2019.01) | |

(52) U.S. Cl.
CPC .............. *G02F 1/167* (2013.01); *C09C 3/063* (2013.01); *C09C 3/10* (2013.01); *C09C 2200/1016* (2013.01); *C09C 2200/401* (2013.01); *G02F 2001/1678* (2013.01)

(58) Field of Classification Search
CPC .......................... G02F 1/167; G02F 2011/1678
See application file for complete search history.

(56) References Cited

U.S. PATENT DOCUMENTS

| | | |
|---|---|---|
| 2,800,457 A | 7/1957 | Barrett et al. |
| 3,639,133 A | 2/1972 | Linton |
| 4,001,140 A | 1/1977 | Foris et al. |
| 4,273,672 A | 6/1981 | Vassiliades |
| 4,285,801 A | 8/1981 | Chiang |
| 4,298,448 A | 11/1981 | Muller et al. |
| 4,680,103 A | 7/1987 | Beilin et al. |
| 4,891,245 A | 1/1990 | Micale |
| 5,360,689 A | 11/1994 | Hou et al. |
| 5,498,674 A | 3/1996 | Hou et al. |
| 5,783,614 A | 7/1998 | Chen et al. |

(Continued)

OTHER PUBLICATIONS

Gutcho, M.H., "Microcapsules and Microencapsulation Techniques", Noyes Data Corp., Park Ridge, New Jersey, (1976).

(Continued)

*Primary Examiner* — Alexandre F Ferre
(74) *Attorney, Agent, or Firm* — Ioannis Constantinides

(57) ABSTRACT

An electrophoretic particle including a pigment particle having an intermediate residue covalently bonded to the surface of the pigment particle and a polymer bonded to the intermediate residue. The polymer may be derived from one or more types of monomers and at least one of the monomers is a substituted or unsubstituted styrene monomer including halogenated styrenic monomers. The electrophoretic particle may be used in an electrophoretic medium including a dispersion of the particles in a suspending fluid. The electrophoretic medium may be incorporated into an electro-optic display.

12 Claims, 14 Drawing Sheets

(56) References Cited

U.S. PATENT DOCUMENTS

| | | |
|---|---|---|
| 5,914,806 A | 6/1999 | Gordon, II et al. |
| 6,113,810 A | 9/2000 | Hou et al. |
| 6,117,368 A | 9/2000 | Hou |
| 6,241,921 B1 | 6/2001 | Jacobson et al. |
| 6,822,782 B2 | 11/2004 | Honeyman |
| 6,866,760 B2 | 3/2005 | Paolini, Jr. et al. |
| 6,922,276 B2 | 7/2005 | Zhang et al. |
| 6,982,178 B2 | 1/2006 | LeCain et al. |
| 7,002,728 B2 | 2/2006 | Pullen et al. |
| 7,012,600 B2 | 3/2006 | Zehner et al. |
| 7,052,766 B2 | 5/2006 | Zang et al. |
| 7,072,095 B2 | 7/2006 | Liang et al. |
| 7,075,502 B1 | 7/2006 | Drzaic et al. |
| 7,116,318 B2 | 10/2006 | Amundson et al. |
| 7,144,942 B2 | 12/2006 | Zang et al. |
| 7,170,670 B2 | 1/2007 | Webber |
| 7,312,784 B2 | 12/2007 | Baucom et al. |
| 7,339,715 B2 | 3/2008 | Webber et al. |
| 7,382,514 B2 | 6/2008 | Hsu et al. |
| 7,411,719 B2 | 8/2008 | Paolini, Jr. et al. |
| 7,453,445 B2 | 11/2008 | Amundson |
| 7,535,624 B2 | 5/2009 | Amundson et al. |
| 7,679,814 B2 | 3/2010 | Paolini, Jr. et al. |
| 7,715,088 B2 | 5/2010 | Liang et al. |
| 7,839,564 B2 | 11/2010 | Whitesides et al. |
| 8,009,348 B2 | 8/2011 | Zehner et al. |
| 8,582,196 B2 | 11/2013 | Walls et al. |
| 8,610,998 B2 | 12/2013 | Baisch et al. |
| 9,158,174 B2 | 10/2015 | Walls et al. |
| 9,279,906 B2 | 3/2016 | Kang |
| 10,254,622 B2 | 4/2019 | Wang et al. |
| 10,444,553 B2 | 10/2019 | Laxton |
| 2005/0000813 A1* | 1/2005 | Pullen .................. G02B 26/026 |
| | | 204/601 |
| 2013/0128435 A1 | 5/2013 | Mizuta et al. |
| 2015/0005720 A1 | 1/2015 | Zang |
| 2016/0012710 A1 | 1/2016 | Lu et al. |
| 2016/0177103 A1* | 6/2016 | Farrand .................. C09C 3/10 |
| | | 252/511 |

OTHER PUBLICATIONS

Vandegaer, J.E. (ed.), "Microencapsulation Processes and Applications", pp. v-x, 1-180, Plenum Press, New York, (1974).

Korean Intellectual Property Office, PCT/US2020/027461, International Search Report and Written Opinion, dated Jul. 17, 2020. dated Jul. 17, 2020.

* cited by examiner

| Co-monomer | Mw | Mn | PDI | Mz | Mp | TGA | Wash TGA | ZP (mV) | F [ppm] | Cl [ppm] | Br [ppm] |
|---|---|---|---|---|---|---|---|---|---|---|---|
| 1% styrene | 179291 | 72297 | 2.48 | 350802 | 155150 | 7.21% | 6.96% | -44.4 | | | |
| 1% 4-chlorostyrene | 185272 | 76393 | 2.43 | 361198 | 159294 | 7.57% | 7.34% | -59.5 | | 685 | 1 |
| 1% 4-bromostyrene | 180676 | 75134 | 2.40 | 348384 | 155150 | 7.56% | 7.26% | -58.1 | | 428 | 308 |
| 1% 4-fluorostyrene | 185944 | 78852 | 2.36 | 362995 | 159294 | 7.69% | 7.43% | -59.1 | 232 | | |
| 1% pentafluorostyrene | 195184 | 72728 | 2.68 | 392155 | 172495 | 7.68% | 7.56% | -58.1 | 656 | | |
| 2% styrene | 175747 | 79795 | 2.20 | 332432 | 145315 | 7.57% | 7.31% | -47.1 | | | |
| 2% 4-chlorostyrene | 177427 | 72838 | 2.44 | 347786 | 151129 | 7.89% | 7.64% | -62.3 | | 747 | 1 |
| 2% 4-bromostyrene | 181180 | 81738 | 2.22 | 349163 | 155150 | 7.81% | 7.66% | -65.4 | | 311 | 453 |
| 2% 4-fluorostyrene | 184146 | 73211 | 2.52 | 370185 | 153125 | 7.64% | 7.47% | -62.6 | 267 | 296 | 2 |
| 5% styrene | 145929 | 73944 | 1.97 | 254301 | 127693 | 7.02% | 6.81% | -54.0 | | | |
| 5% 4-chlorostyrene | 139962 | 63616 | 2.20 | 249823 | 122890 | 7.61% | 7.50% | -71.7 | | 890 | 1 |
| 5% 4-bromostyrene | 149490 | 66241 | 2.26 | 275041 | 132711 | 7.55% | 7.44% | -77.2 | | 298 | 671 |
| 5% 4-fluorostyrene | 154074 | 70811 | 2.18 | 283267 | 131014 | 7.80% | 7.70% | -77.5 | 535 | 312 | 1 |

Figure 4

| Co-monomer | Sample | 30 sec States | | | | 5 min Image Stability | |
|---|---|---|---|---|---|---|---|
| | | WS | DS | DR | CR | WS Range | DS Range |
| 1% TFEM | 1011-28-I | 75 | 20 | 56 | 17 | 0.8 | 1.1 |
| 1% styrene | 1011-28-A | 74 | 20 | 54 | 16 | 0.4 | 0.4 |
| | 1011-28-B | 73 | 20 | 53 | 15 | 0.4 | 0.3 |
| 1% F-styrene | 1011-28-G | 74 | 20 | 55 | 16 | 0.3 | 0.4 |
| | 1011-28-H | 74 | 20 | 54 | 16 | 0.2 | 0.4 |
| 1% Cl-styrene | 1011-28-C | 73 | 20 | 54 | 16 | 0.2 | 0.4 |
| | 1011-28-D | 72 | 20 | 52 | 15 | 0.3 | 0.4 |
| 1% Br-styrene | 1011-28-E | 74 | 19 | 55 | 17 | 0.3 | 0.6 |
| | 1011-28-F | 74 | 19 | 55 | 17 | 0.3 | 0.6 |

Figure 5

| Co-monomer | Sample | 30 sec States | | | | 5 min Image Stability | |
|---|---|---|---|---|---|---|---|
| | | WS | DS | DR | CR | WS Range | DS Range |
| 1% TFEM | 1011-41-L | 76 | 21 | 55 | 16 | 0.8 | 0.9 |
| 2% styrene | 1011-41-A | 76 | 18 | 58 | 20 | 0.2 | 0.4 |
| 2% F-styrene | 1011-41-H | 76 | 21 | 55 | 15 | 0.6 | 0.8 |
| | 1011-41-I | 76 | 22 | 55 | 15 | 0.6 | 0.7 |
| 2% Cl-styrene | 1011-41-C | 75 | 20 | 55 | 16 | 0.3 | 0.9 |
| | 1011-41-D | 75 | 19 | 55 | 17 | 0.3 | 1.0 |
| 2% Br-styrene | 1011-41-F | 76 | 21 | 55 | 15 | 0.6 | 0.8 |

Figure 6

ELECTROPHORETIC PARTICLES, MEDIA, AND DISPLAYS AND PROCESSES FOR THE PRODUCTION THEREOF

REFERENCE TO RELATED APPLICATIONS

This application claims priority to U.S. Patent Application No. 62/837,760 filed on Apr. 24, 2019, which is incorporated by reference herein in its entirety.

BACKGROUND OF INVENTION

This invention relates to electrophoretic particles (i.e., particles for use in an electrophoretic medium) and processes for the production of such electrophoretic particles. This invention also relates to electrophoretic media and displays incorporating such particles. More specifically, this invention relates to electrophoretic particles the surfaces of which are modified with polymers.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.)

Electrophoretic media can be divided into two main types, referred to hereinafter for convenience as "single particle" and "dual particle" respectively. A single particle medium has only a single type of electrophoretic particle suspended in a colored suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) The optical characteristic is typically color visible to the human eye, but may, alternatively or in addition, be any one or more of reflectivity, retroreflectivity, luminescence, fluorescence, phosphorescence, or color in the broader sense of meaning a difference in absorption or reflectance at non-visible wavelengths. When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If, the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

The service life of encapsulated electrophoretic displays, of both the single and dual particle types, may be limited by factors such as sticking of the electrophoretic particles to the capsule wall, and the tendency of particles to aggregate into clusters which prevent the particles completing the movements necessary for switching of the display between its optical states. In this regard, opposite charge dual particle electrophoretic displays pose a particularly difficult problem, since inherently oppositely charged particles in close proximity to one another will be electrostatically attracted to each other and will display a strong tendency to form stable aggregates. Experimentally, it has been found that if one attempts to produce a black/white encapsulated display of this type using untreated commercially available titania and carbon black pigments, the display either does not switch at all or has a service life so short as to be undesirable for commercial purposes.

It has long been known that the physical properties and surface characteristics of electrophoretic particles can be modified by adsorbing various materials on to the surfaces of the particles, or chemically bonding various materials to these surfaces. For example, U.S. Pat. No. 4,285,801 describes an electrophoretic display composition in which the particles are coated with a highly fluorinated polymer, which acts as a dispersant, and which is stated to prevent the particles from flocculating and to increase their electrophoretic sensitivity. U.S. Pat. No. 4,298,448 describes an electrophoretic medium in which the particles are coated with an organic material, such as a wax, which is solid at the operating temperature of the medium but which melts at a higher temperature. The coating serves to lower the density of the electrophoretic particles and is also stated to increase the uniformity of the charges thereon. U.S. Pat. No. 4,891,245 describes a process for producing particles for use in electrophoretic displays, wherein a heavy, solid pigment, preferred for its high contrast or refractive index properties, is coated with a polymeric material. This process significantly reduces the specific density of the resultant particle, and is stated to create particles with smooth polymer surfaces that can be chosen for stability in a given electrophoretic carrier fluid, and possess acceptable el ectrophoretic characteristics. U.S. Pat. No. 4,680,103 describes a single particle electrophoretic display using inorganic pigment particles coated with an organosilane derivative containing quaternary ammonium groups; this coating is stated to provide quick release of the particles from the electrode adjacent the observer and resistance to agglomeration.

Later, it was found that simple coating of the electrophoretic particles with the modifying material was not entirely satisfactory since a change in operating conditions might cause part or all of the modifying material to leave the surface of the particles, thereby causing undesirable changes in the electrophoretic properties of the particles; the modifying material might possibly deposit on other surfaces within the electrophoretic display, which could give rise to further problems. Accordingly, techniques have been developed for securing the modifying material to the surface of the particles.

For example, U.S. Pat. No. 5,783,614 describes an electrophoretic display using diarylide yellow pigment particles modified with a polymer of pentafluorostyrene. The modified particles are produced by forming a mixture of the unmodified particles, the pentafluorostyrene monomer and a free radical initiator, and heating and agitating this mixture so that the monomer polymerizes in situ on the surface of the particles.

U.S. Pat. No. 5,914,806 describes electrophoretic particle formed by reacting pigment particles with a pre-formed polymer so that the polymer becomes covalently bonded to the surface of the particles. This process is of course restricted to pigments and polymers having chemical properties which allow the necessary reaction to form the covalent bond. Furthermore, a polymer with only a few sites capable of reacting with the particle material has difficulty in reacting with the solid interface at the particle surface; this can be due to polymer chain conformation in solution, steric congestion at the particle surface, or slow reactions between the polymer and the surface. Often, these problems restrict such reactions to short polymer chains, and such short chains typically only have a small effect on particle stability in electrophoretic media.

It is also known to use, in electrophoretic displays, particles consisting essentially of polymer; if dark colored particles are required, the polymer particles can be stained with a heavy metal oxide. See, for example, U.S. Pat. Nos. 5,360,689; 5,498,674; and 6,117,368. Although forming the electrophoretic particles from a polymer allows close control over the chemical composition of the particles, such polymer particles usually have much lower opacity than particles formed from inorganic pigments.

Thus, there is a need for improved coatings on pigment particles intended for electrophoretic media.

SUMMARY OF INVENTION

In one aspect, this invention provides an electrophoretic particle comprising a pigment particle having an intermediate residue covalently bonded to the surface of the pigment particle and a polymer bonded to the intermediate residue. The polymer is derived from one or more monomers and at least one of the monomers is a styrene monomer having a phenyl group according to Formula I:

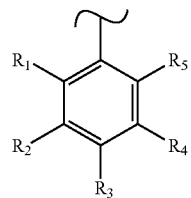
(Formula I)

wherein at least one of $R_1$, $R_2$, $R_3$, $R_4$, and $R_5$ is selected from the group consisting of hydrogen and a halogen. The electrophoretic particles may be included in an electrophoretic medium comprising a dispersion of the particles in a suspending fluid. The electrophoretic medium may be incorporated into an electro-optic display.

These and other aspects of the present invention will be apparent in view of the following description.

BRIEF DESCRIPTION OF DRAWINGS

Preferred embodiments of the invention will now be described, though by way of illustration only, with reference to the accompanying drawings, in which:

FIG. 4 is a table reporting the zeta potential (ZP) of a number of pigments featuring halo styrene co-monomer units. Mw: Molecular Weight; Mn: Number Average Molecular Weight; PDI: Polidispersity Index; Mz: Z-average Molecular Weight; Mp: Peak Molecular Weight.

FIGS. 5 and 6 are tables reporting the results of electro-optical measurements conducted on pixels featuring example pigments.

DEFINITIONS

Figure 1:
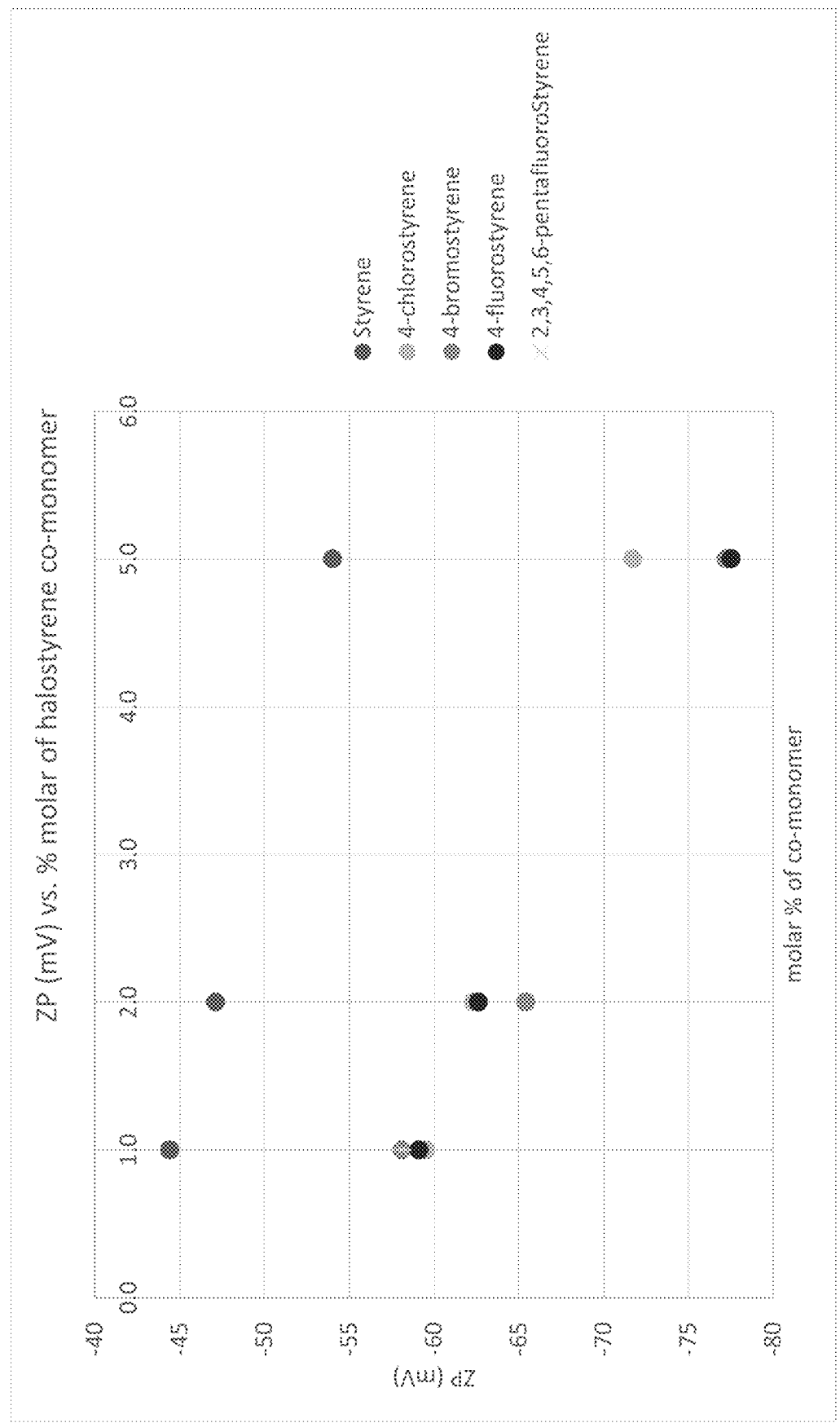
FIG. 1 is a plot of Zeta potential vs. molar percent of styrenic monomeric units within a polymer coating for various pigment particles coated with the polymer coating.
Figure 2A:
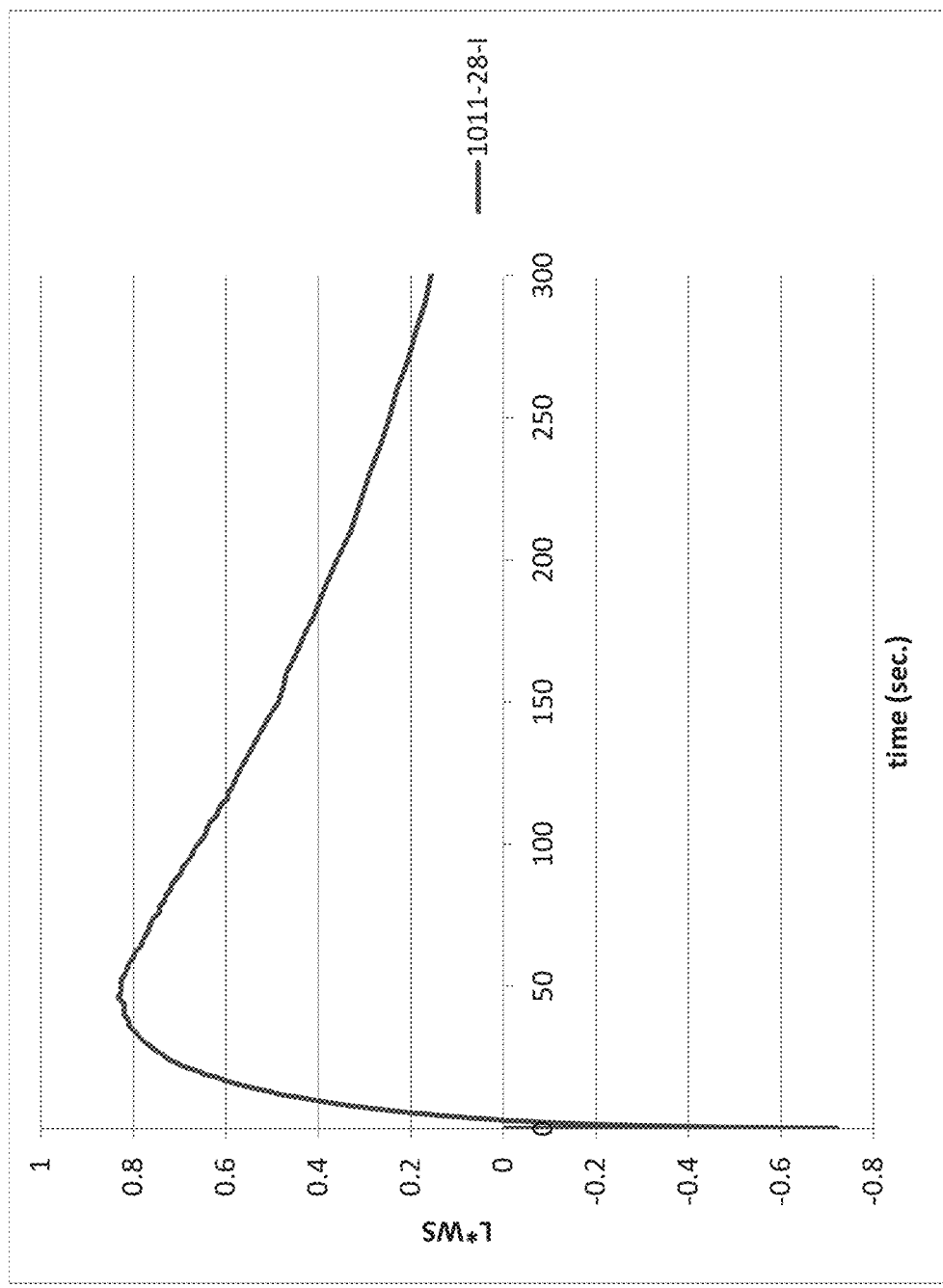
FIGS. 2A to 2E and FIGS. 3A to 3E are plots of the white state L* values calculated from reflectivity measurements taken over a 5 minute interval for various display samples containing pigment particles coated with a polymer coating.
Figure 2B:
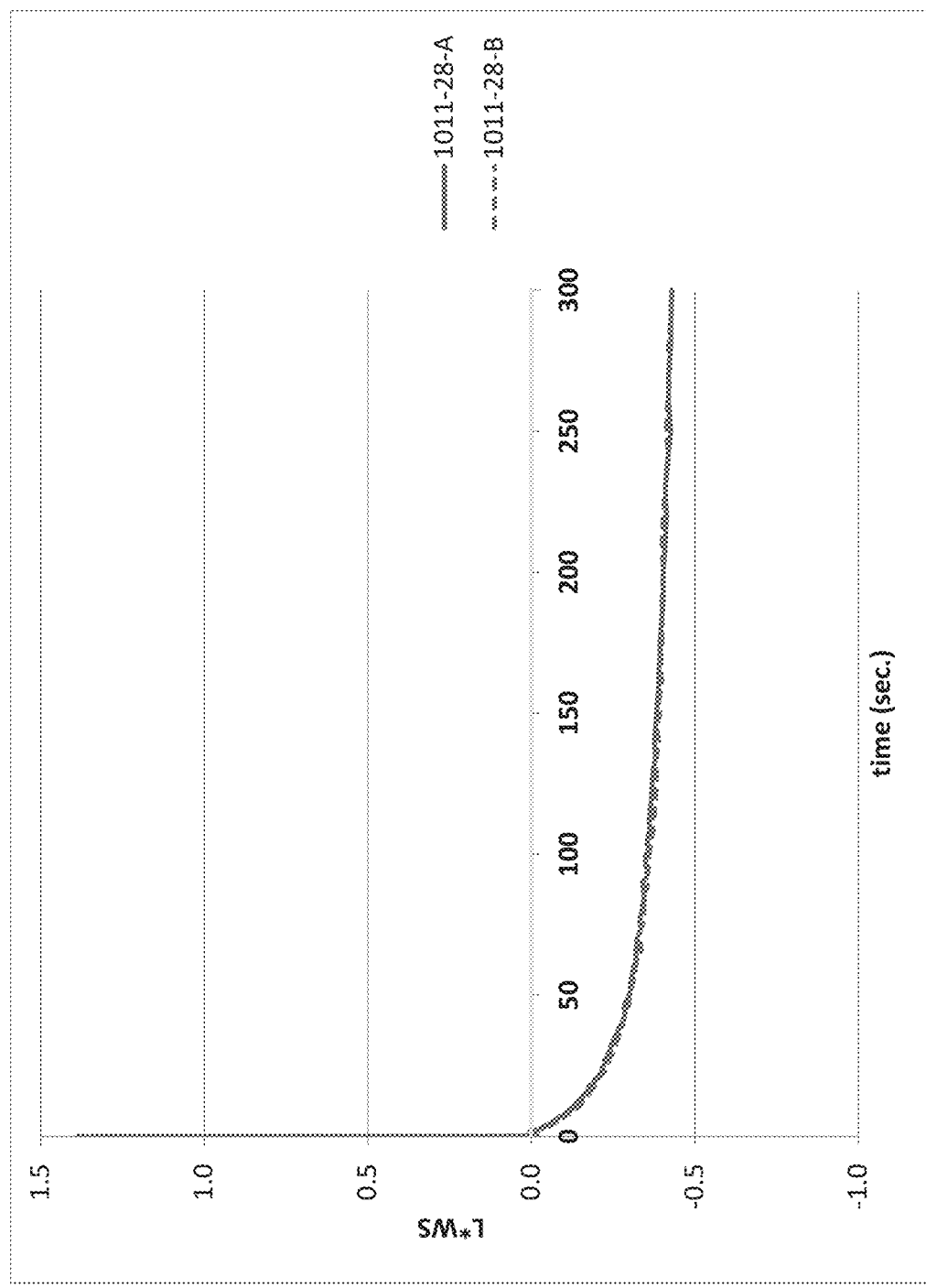
Figure 2C:
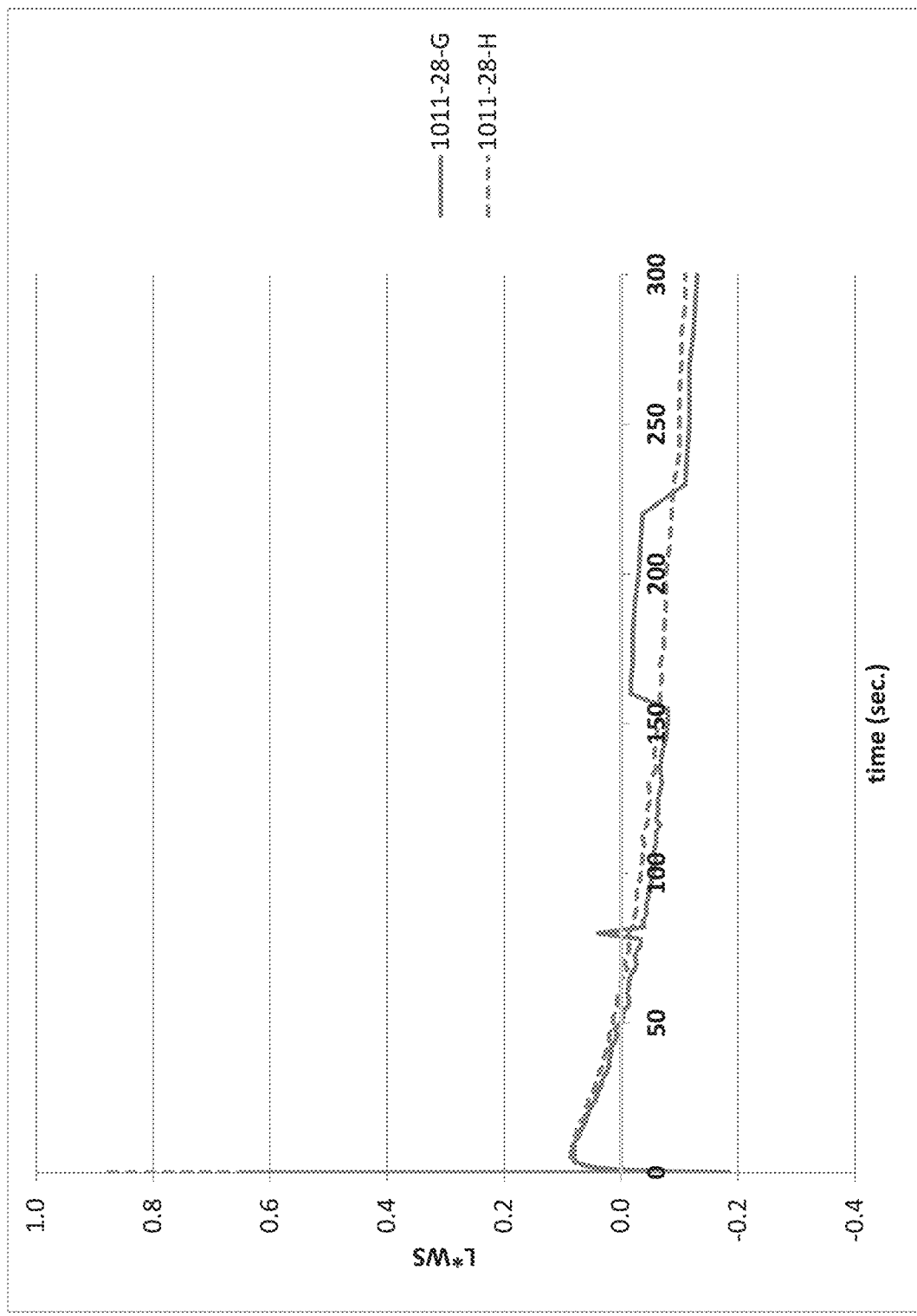
Figure 2D:
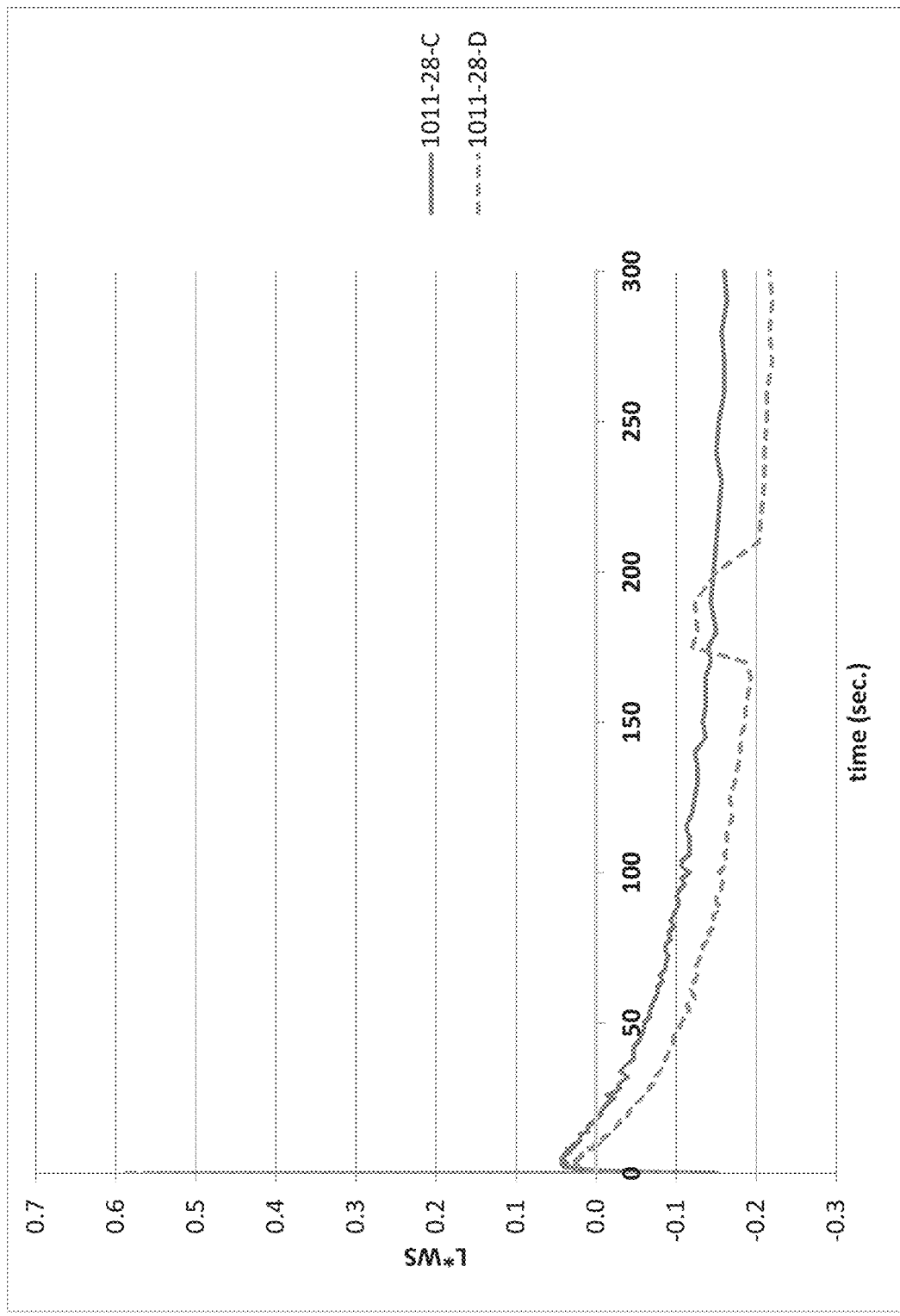
Figure 2E:
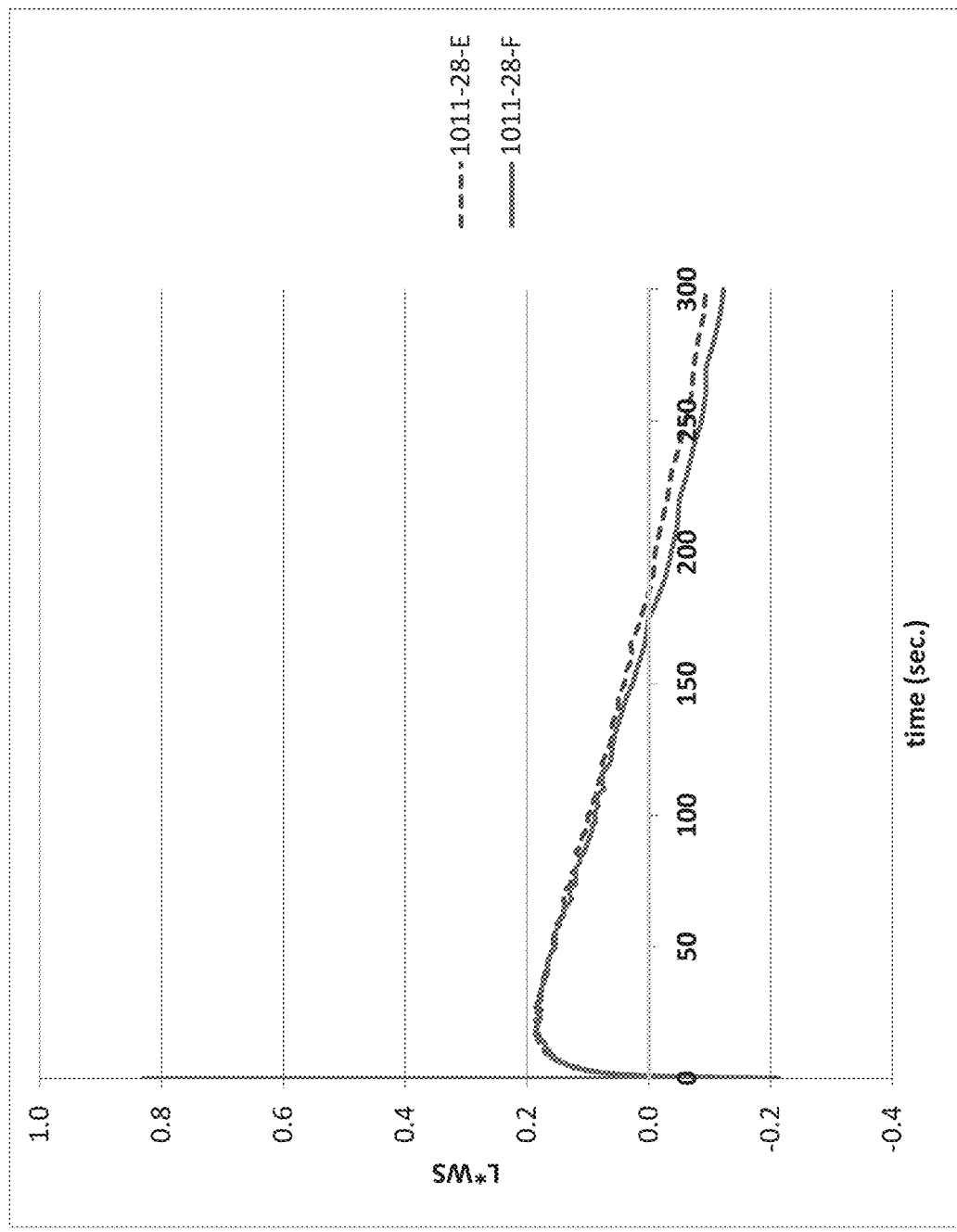
Figure 3A:
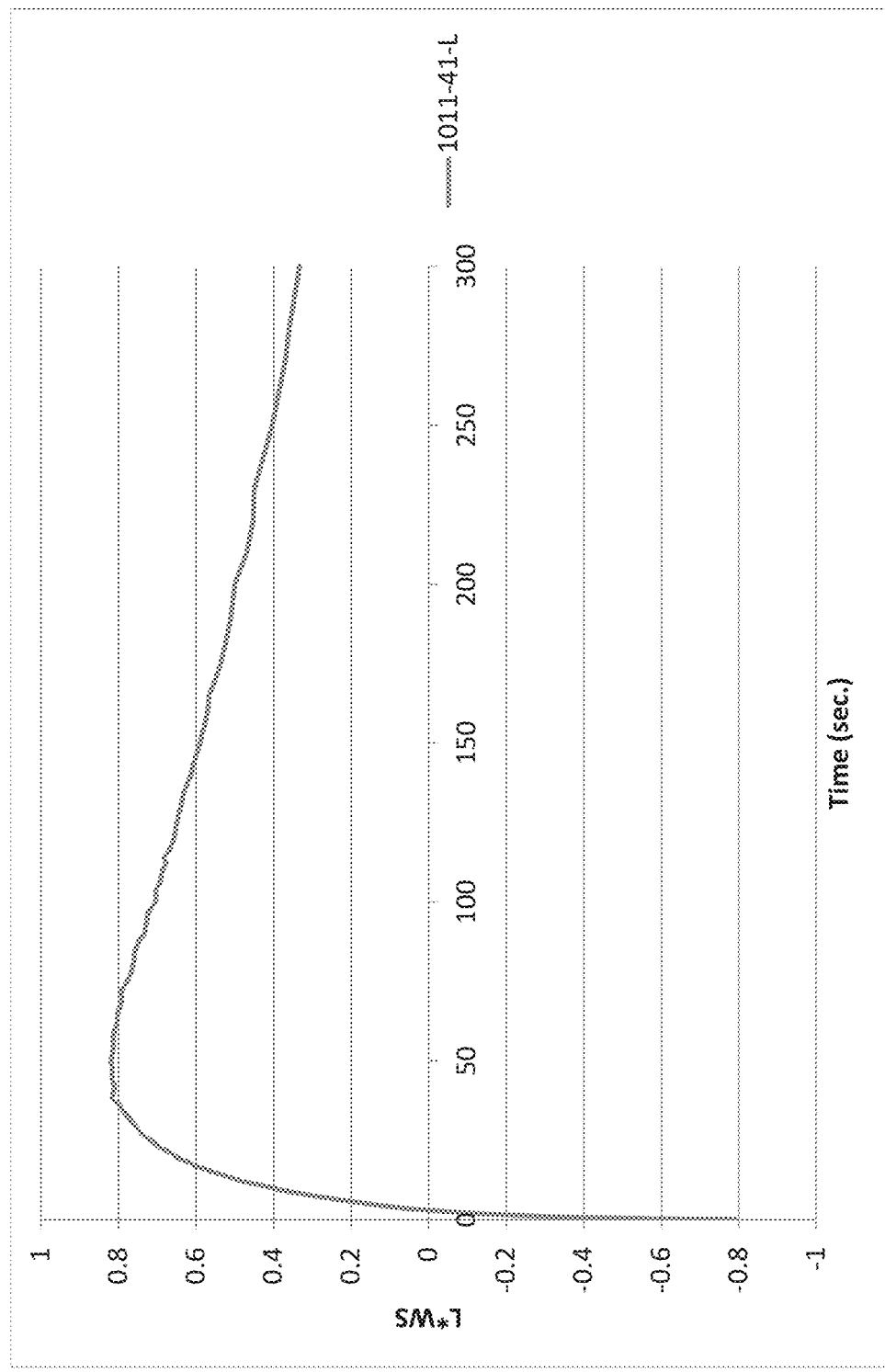
Figure 3B:
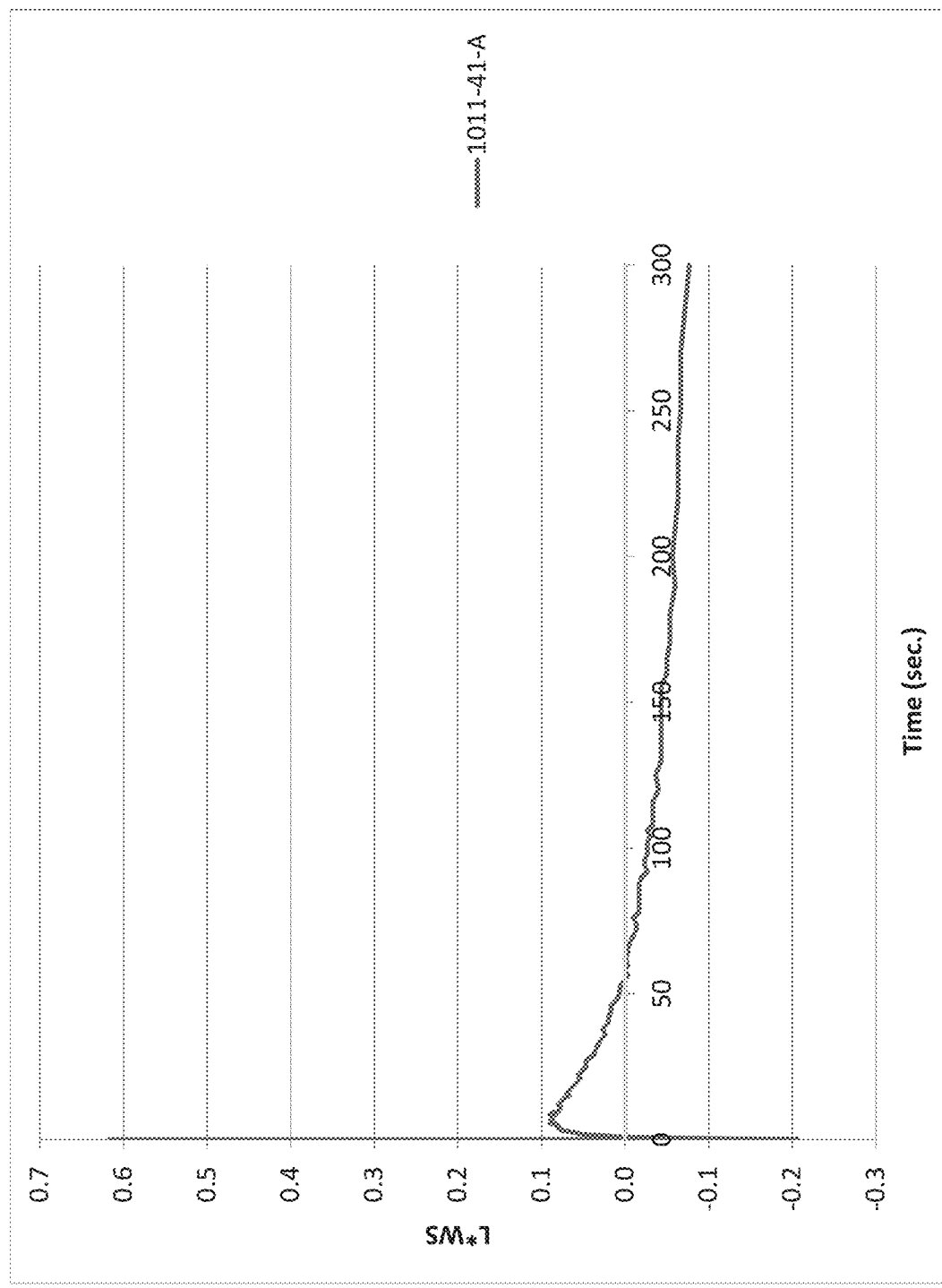
Figure 3C:
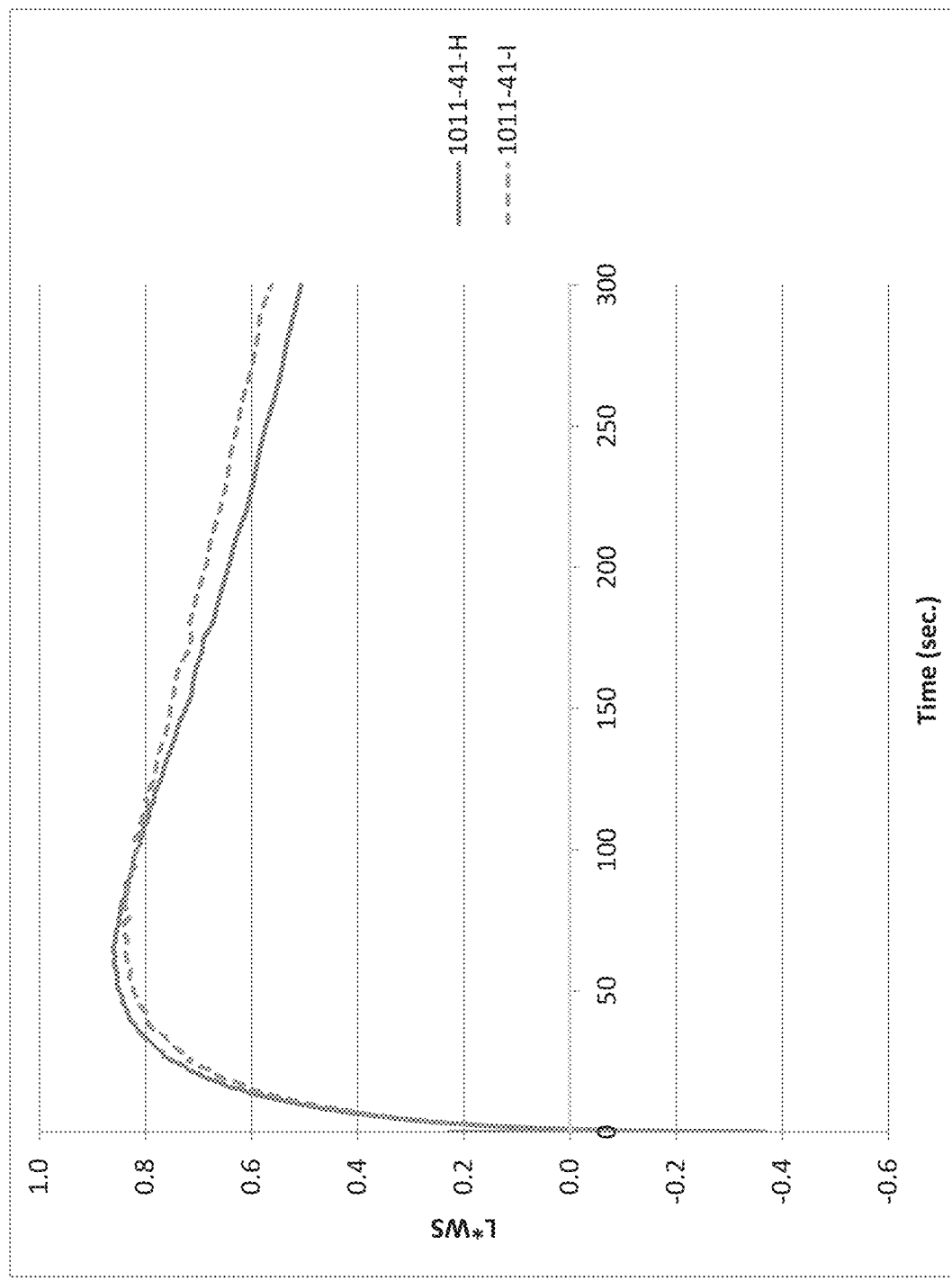
Figure 3D:
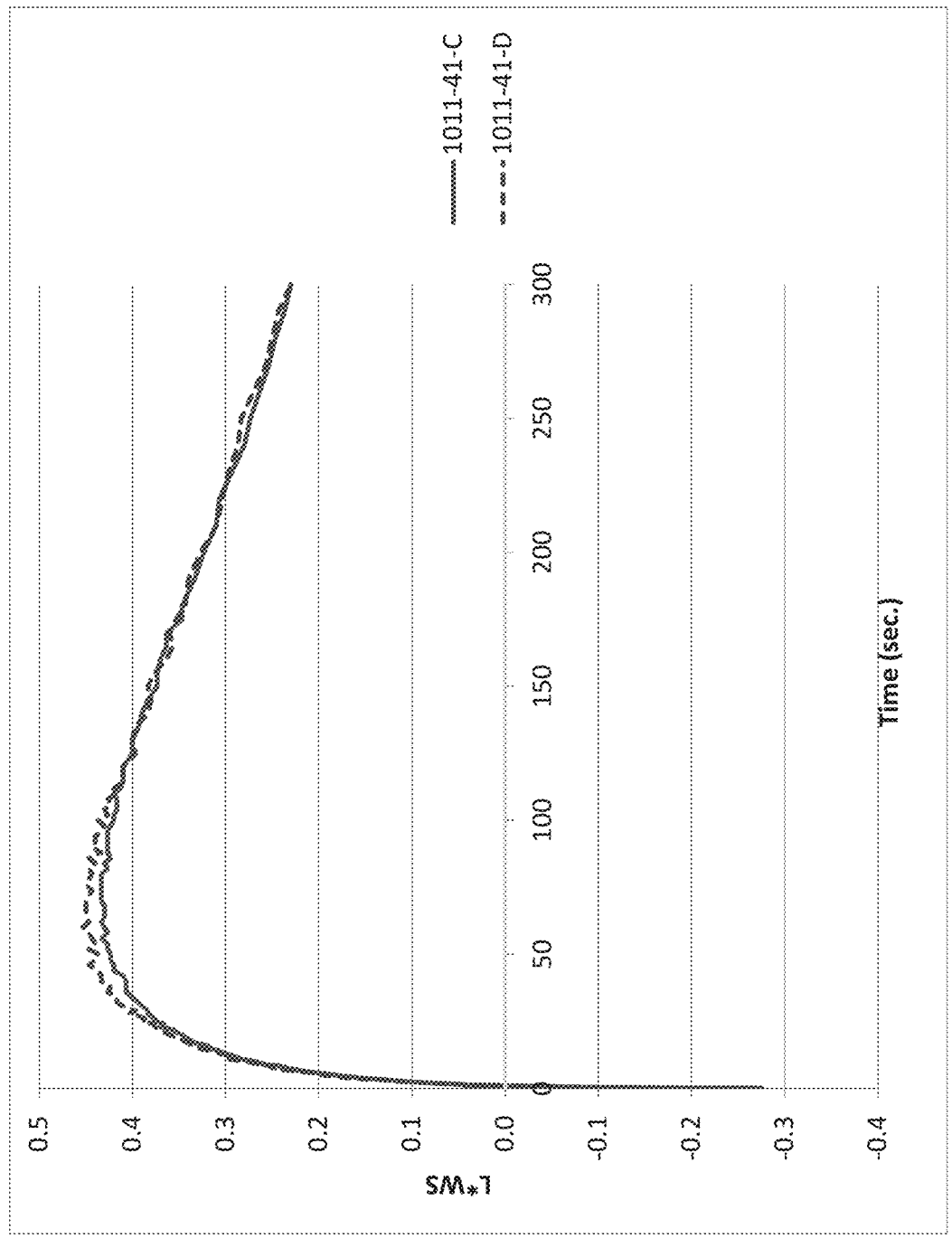
Figure 3E:
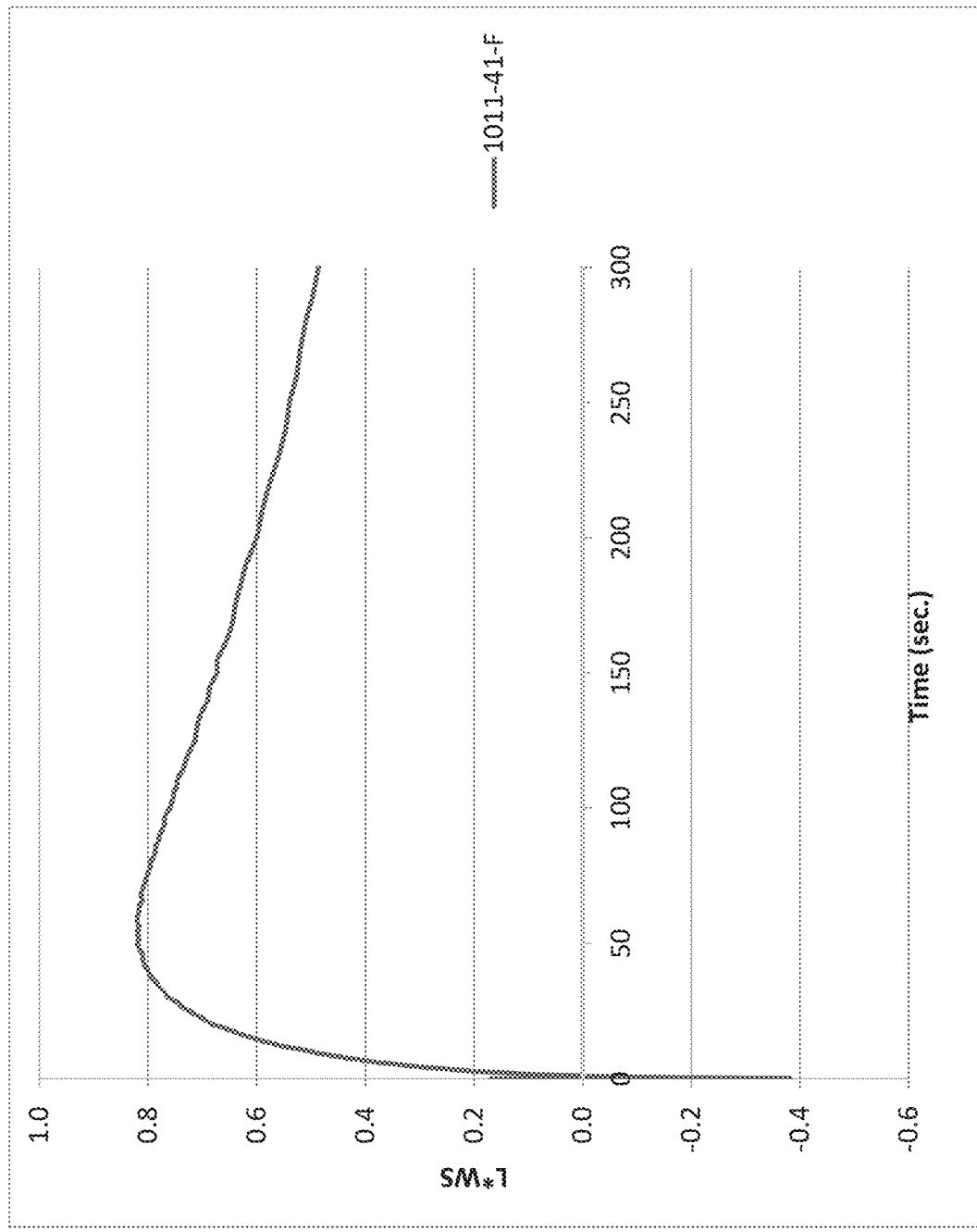

The term "polymer" as used herein refers to a polymeric compound prepared by polymerizing monomers, whether of the same or of two or more types. The generic name polymer is therefore intended to encompass the term "homopolymer" and the term "interpolymer" as defined herein below. Trace amounts of impurities can be incorporated into and/or within the polymer structure.

The term "interpolymer" as used herein refers to a polymer prepared by the polymerization of at least two different monomers. The generic name interpolymer includes copolymers (used to refer to polymers prepared from two different types of monomers) and polymers prepared from more than two different types of monomers. Hence, a "polymer derived from one or more monomers" refers to a homopolymer when the monomer is one, a copolymer when the monomers are two, and other types of interpolymers in instances where the monomers are three or more.

The term "monomeric unit, "monomer unit", "monomer residue", or "monomeric residue" is understood to mean the residue resulting from the polymerization of the corresponding monomer. For example, a polymer derived from the polymerization of styrene monomers will provide polymeric segment comprising repeat styrenic monomeric units, i.e., "—CH($C_6H_5$)$CH_2$—."

DETAILED DESCRIPTION

Various embodiments of the present invention provide electrophoretic media that may be incorporated into electrophoretic displays. Numerous patents and applications assigned to or in the names of the Massachusetts Institute of Technology (MIT), E Ink Corporation, E Ink California, LLC and related companies describe various technologies used in encapsulated and microcell electrophoretic and other electro-optic media. Encapsulated electrophoretic media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation and color adjustment; see for example U.S. Pat. Nos. 7,075,502 and 7,839,564;

(h) Methods for driving displays; see for example U.S. Pat. Nos. 7,012,600 and 7,453,445;

(i) Applications of displays; see for example U.S. Pat. Nos. 7,312,784 and 8,009,348; and (j) Non-electrophoretic displays, as described in U.S. Pat. No. 6,241,921 and U.S. Patent Applications Publication Nos. 2015/0277160; and applications of encapsulation and microcell technology other than displays; see for example U.S. Patent Application Publications Nos. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see, for example, U.S. Pat. No. 6,866,760. Accordingly, for purposes of the present application, such polymer-dispersed electrophoretic media are regarded as sub-species of encapsulated electrophoretic media.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

The manufacture of a three-layer electrophoretic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one preferred form of such a process, the backplane is itself flexible and is prepared by printing the pixel electrodes and conductors on a plastic film or other flexible substrate. The obvious lamination technique for mass production of displays by this process is roll lamination using a lamination adhesive.

The present invention may be applied to any of the forms of encapsulated electrophoretic media described above.

However, the present invention is not restricted to encapsulated media, and may also be applied to unencapsulated media.

The present invention may be applied to any type of particle useable electrophoretic media, and there is much flexibility in the choice of such particles. For purposes of this invention, a particle is any component that is charged or capable of acquiring a charge (i.e., has or is capable of acquiring electrophoretic mobility), and, in some cases, this mobility may be zero or close to zero (i.e., the particles will not move). The particles may be, for example, neat pigments or dyed (laked) pigments, or any other component that is charged or capable of acquiring a charge. Typical considerations for the electrophoretic particle are its optical properties, electrical properties, and surface chemistry. The particles may be organic or inorganic compounds, and they may either absorb light or scatter light. The particles for use in the invention may further include scattering pigments, absorbing pigments and luminescent particles. The particles may be retroreflective, such as corner cubes, or they may be electroluminescent, such as zinc sulfide particles, which emit light when excited by an AC field, or they may be photoluminescent. Zinc sulfide electroluminescent particles may be encapsulated with an insulative coating to reduce electrical conduction.

The electrophoretic particle is usually a pigment, a laked pigment, or some combination of the above. A neat pigment can be any pigment, and, usually for a light colored particle, pigments such as rutile (titania), anatase (titania), barium sulfate, kaolin, or zinc oxide are useful. Some typical particles have high refractive indices, high scattering coefficients, and low absorption coefficients. Other particles are absorptive, such as carbon black or colored pigments used in paints and inks. The pigment should also be insoluble in the suspending fluid. Yellow pigments such as diarylide yellow, Hansa yellow, and benzidin yellow have also found use in similar displays. Any other reflective material can be employed for a light colored particle, including non-pigment materials, such as metallic particles.

Particles may also include laked, or dyed, pigments. Laked pigments are particles that have a dye precipitated on them or which are stained. Lakes are metal salts of readily soluble anionic dyes. These are dyes of azo, triphenylmethane or anthraquinone structure containing one or more sulphonic or carboxylic acid groupings. They are usually precipitated by a calcium, barium or aluminum salt onto a substrate. Typical examples are peacock blue lake (C1 Pigment Blue 24) and Persian orange (lake of C1 Acid Orange 7), Black M Toner (GAF) (a mixture of carbon black and black dye precipitated on a lake).

A dark particle of the dyed type may be constructed from any light absorbing material, such as carbon black, or inorganic black materials. The dark material may also be selectively absorbing. For example, a dark green pigment may be used.

The optical purpose of the particle may be to scatter light, absorb light, or both. Useful sizes may range from 1 nm up to about 100 μm. The density of the electrophoretic particle may be substantially matched to that of the suspending (i.e., electrophoretic) fluid. As defined herein, a suspending fluid has a density that is "substantially matched" to the density of the particle if the difference in their respective densities is between about zero and about two grams/milliliter ("g/ml"). This difference is preferably between about zero and about 0.5 g/ml.

New and useful electrophoretic particles may still be discovered, but a number of particles already known to those skilled in the art of electrophoretic displays and liquid toners can also prove useful.

The presently preferred materials for forming white-colored electroparticles are metal oxides (and/or hydroxides), especially titania. The titania particles may be coated with an oxide, such as alumina or silica, for example; the presence of such coatings appears to improve the stability of the titania in electrophoretic media, presumably by suppressing reactions, such as photochemical reactions, which may occur at the interface between a bare titania surface and the suspending fluid. The titania particles may have one, two, or more layers of metal-oxide coating. For example, a titania particle for use in electrophoretic displays of the invention may have a coating of alumina and a coating of silica. The coatings may be added to the particle in any order. Alternatively, the titania particle may have a silica/alumina coating in which the surface of the titania particle includes discrete areas of silica and alumina. Such a coated titania is commercially available from E.I. du Pont de Nemours and Company, Wilmington, Del., under the trade name R960. It will be appreciated that since, in such coated particles, the coating completely covers the titania, any reagent used to attach an initiator or polymerizable group to the surface of the particle must react with the coating, and need not be capable of reacting with titania. It is one important advantage of the present invention that, since techniques for forming silica coatings on pigments are described in the literature (see, for example, U.S. Pat. No. 3,639,133), and such techniques may readily be adapted to produce silica coatings on a wide variety of materials, the present processes can readily be adapted to utilize any of these materials by first providing a silica coating thereon. Another preferred technique of producing a silica coating on the surface of a particle is described in U.S. Pat. No. 6,822,782. Once the silica coating has been applied, the remaining steps in forming the polymer-coated particles are essentially similar, since the reagents used "see" only the silica coating, so that the chemical process steps are essentially independent of the chemical nature of the pigment underlying the silica coating. The particle surface should have at least some areas of exposed silica in order to react with a bifunctional reagent, preferably silane coupling agents discussed below, that react with silica and form a link between the particle surface and polymer coatings.

Preferred materials for forming dark-colored electroparticles include copper chromite black spine, such as C.I. Pigment Black 28 sold commercially as Black 20C920 by The Shepherd Color Company, Cincinnati, Ohio, or manganese ferrite black spinel, such as C.I. Pigment Black 26 also sold commercially as Black 444 by The Shepherd Color Company.

According to the various embodiments of the present invention, electrophoretic particles may provide improved electrophoretic dispersions when the pigment particles are coated with a polymer derived from one or more monomers comprising an unsubstituted or substituted styrene monomer. The styrene monomers may include a phenyl group according to Formula 1:

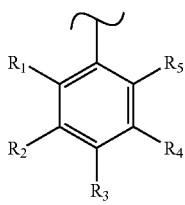

(Formula I)

wherein at least one of $R_1$, $R_2$, $R_3$, $R_4$, and $R_5$ is selected from the group consisting of hydrogen and a halogen. Examples of substituted styrene monomers include, but are not limited to, 4-fluorostyrene, 2-fluorostyrene, 4-chlorostyrene, 2-chlorostyrene, 4-bromostyrene, 2-bromo-styrene, 4-iodostyrene, 2-iodostyrene, and combinations thereof.

As will appear from the Examples below, use of styrenic monomers to form the polymer shells of particles used in electrophoretic displays increases the zeta potential of negatively charged particles. The zeta potential becomes increasingly negative as the proportion of styrenic monomeric units in the polymer shell increases. It will be appreciated that with respect to substituted styrenic monomers, the optimum proportion of halogenated monomeric units may vary somewhat with the specific halogenated styrene monomer used, the other monomers employed and other factors, including the other particles present in the electrophoretic medium.

The polymer-coated particles used in the electrophoretic media of the present invention may be produced by any of the processes described in the aforementioned U.S. Pat. No. 6,822,782, the entire content of which is incorporated by reference herein.

In one such process, the particles on which a polymer coating is to be formed are reacted with a bifunctional reagent having a functional group capable of reacting with, and bonding to, the particle surface and a polymerizable group, for example a pendant vinyl or other ethylenically unsaturated group, that may be polymerized with other polymerizable monomers including a styrenic monomer. The bifunctional reagent therefore is converted into an intermediate residue that forms a link between the surface of the pigment particle and the polymer coating. The preferred class of functional groups of the bifunctional reagent for bonding to titania and similar silica-coated pigments are silane coupling groups, especially trialkoxy silane coupling groups. One especially preferred reagent for attaching a polymerizable group to titania and similar pigments is the aforementioned 3-(trimethoxysilyl)propyl methacrylate, which is available commercially from Dow Chemical Company, Wilmington, Del. under the trade name Z6030. The corresponding acrylate may also be used.

In another process the bifunctional reagent has a first functional group capable of reacting with, and bonding to, the particle surface and a second functional group capable of forming an ionic bond with a polymerizable monomer, such as through an acid-base reaction. For example, the bifunctional reagent may be a silane coupling agent containing a basic group, preferably a substituted ammonium group, such as N-trimethoxysilylpropyl-N,N,N-tritnethylammonium chloride, thereby providing amino groups on a silica coated particle surface. The resultant amino-functionalized particle is then preferably treated with an acid containing the desired polymerizable group, such as 4-styrene sulfonic acid chloride dihydrate, to obtain a pigment with styrene functionality ionically associated with the quaternary ammonium groups. The styrene functional groups may then be polymerized with the one or more monomers including a substituted or unsubstituted styrene monomer.

In yet another process, the bifunctional reagent has a first functional group capable of reacting with, and bonding to, the particle surface and a second functional group that provides an initiating site for atom transfer radical polymerization. One or more monomers including the substituted or unsubstituted styrene monomer may then be polymerized at the initiating site.

The polymerizable group is then reacted with one or more monomers that include a substituted or unsubstituted styrene monomer under conditions to effect polymerization. Additional monomers that may be polymerized with the substituted or unsubstituted styrene monomers to form the polymeric coating around the pigment particles, include, but are not limited to, 2-ethylhexyl methacrylate, methyl methacrylate, isobutyl methacrylate, t-butyl methacrylate, lauryl methacrylate, isobornyl methacrylate, 2-ethylhexyl acrylate, t-butyl acrylate, 2,2,3,4,4,4-hexafluoro butyl acrylate, 2,2,2-trifluoroethyl methacrylate, 3,3,4,4,5,5,6,6,7,7,8,8,8-tridecafluorooctyl acrylate, 2-fluoroethyl methacrylate, 2-fluoroethyl acrylate, 2-chloroethyl methacrylate, 2-chloroethyl acrylate, 2-bromoethyl methacrylate, 2-bromoethyl acrylate and combinations thereof. Alternatively, previously recited steps may be reversed, such that one or more monomers including the substituted or unsubstituted styrene monomers may be pre-polymerized to form oligomers and/or polymers that may be subsequently bonded to the pigment particles.

Apart from the provision of the polymer on the pigment particles, the electrophoretic media of the present invention may employ the same components and manufacturing techniques as in the aforementioned Massachusetts Institute of Technology and E Ink Corporation patents and applications. The following sections describe useful materials for use in the various components of the encapsulated electrophoretic displays of the present invention.

A. Suspending Fluid

The suspending fluid containing the particles should be chosen based on properties such as density, refractive index, and solubility. A preferred suspending fluid has a low dielectric constant (about 2), high volume resistivity (about $10^{15}$ ohm-cm), low viscosity (less than 5 centistokes ("cst")), low toxicity and environmental impact, low water solubility (less than 10 parts per million ("ppm")), a high boiling point (greater than 90° C.), and a low refractive index (less than 1.2).

The choice of suspending fluid may be based on concerns of chemical inertness, density matching to the electrophoretic particle, or chemical compatibility with both the electrophoretic particle and bounding capsule (in the case of encapsulated electrophoretic displays). The viscosity of the fluid should be low when movement of the particles is desired.

The suspending fluid may comprise a single fluid. The fluid will, however, often be a blend of more than one fluid in order to tune its chemical and physical properties. Furthermore, the fluid may contain surface modifiers to modify the surface energy or charge of the electrophoretic particle or bounding capsule. Reactants or solvents for the microencapsulation process (oil soluble monomers, for example) can also be contained in the suspending fluid. Charge control agents can also be added to the suspending fluid.

The fluid must be capable of being formed into small droplets prior to a capsule being formed. Processes for forming small droplets include flow-through jets, membranes, nozzles, or orifices, as well as shear-based emulsifying schemes. The formation of small drops may be assisted by electrical or sonic fields. Surfactants and polymers can be used to aid in the stabilization and emulsification of the droplets in the case of an emulsion type encapsulation.

It can be advantageous in some displays for the suspending fluid to contain an optically absorbing dye. This dye must be soluble in the fluid, but will generally be insoluble in the other components of the capsule. There is much flexibility in the choice of dye material. The dye can be a pure compound, or blends of dyes to achieve a particular color, including black. The dyes can be fluorescent, which would produce a display in which the fluorescence properties depend on the position of the particles. The dyes can be photoactive, changing to another color or becoming colorless upon irradiation with either visible or ultraviolet light, providing another means for obtaining an optical response. Dyes could also be polymerizable by, for example, thermal, photochemical or chemical diffusion processes, forming a solid absorbing polymer inside the bounding shell.

There are many dyes that can be used in encapsulated electrophoretic displays. Properties important here include light fastness, solubility in the suspending liquid, color, and cost. These dyes are generally chosen from the classes of azo, anthraquinone, and triphenylmethane type dyes and may be chemically modified so as to increase their solubility in the oil phase and reduce their adsorption by the particle surface.

B. Charge Control Agents and Particle Stabilizers

Charge control agents may be used, with or without charged groups in polymer coatings, to provide good electrophoretic mobility to the electrophoretic particles. Stabilizers may be used to prevent agglomeration of the electrophoretic particles, as well as prevent the electrophoretic particles from irreversibly depositing onto the capsule wall. Either component can be constructed from materials across a wide range of molecular weights (low molecular weight, oligomeric, or polymeric), and may be a single pure compound or a mixture. The charge control agent used to modify and/or stabilize the particle surface charge is applied as generally known in the arts of liquid toners, electrophoretic displays, non-aqueous paint dispersions, and engine-oil additives. In all of these arts, charging species may be added to non-aqueous media in order to increase electrophoretic mobility or increase electrostatic stabilization. The materials can improve steric stabilization as well. Different theories of charging are postulated, including selective ion adsorption, proton transfer, and contact electrification.

An optional charge control agent or charge director may be used. These constituents typically consist of low molecular weight surfactants, polymeric agents, or blends of one or more components and serve to stabilize or otherwise modify the sign and/or magnitude of the charge on the electrophoretic particles. Additional pigment properties which may be relevant are the particle size distribution, the chemical composition, and the lightfastness.

Charge adjuvants may also be added. These materials increase the effectiveness of the charge control agents or charge directors. The charge adjuvant may be a polyhydroxy compound or an aminoalcohol compound, and is preferably soluble in the suspending fluid in an amount of at least 2% by weight. The charge adjuvant is preferably present in the suspending fluid in an amount of about 1 to about 100 milligrams per gram ("mg/g") of the particle mass, and more preferably about 50 to about 200 mg/g.

In general, it is believed that charging results as an acid-base reaction between some moiety present in the continuous phase and the particle surface. Thus useful materials are those which are capable of participating in such a reaction, or any other charging reaction as known in the art.

Particle dispersion stabilizers may be added to prevent particle flocculation or attachment to the capsule walls. For the typical high resistivity liquids used as suspending fluids in electrophoretic displays, non-aqueous surfactants may be used.

If a bistable electrophoretic medium is desired, it may be desirable to include in the suspending fluid a polymer having a number average molecular weight in excess of about 20,000, this polymer being essentially non-absorbing on the electrophoretic particles; poly(isobutylene) is a preferred polymer for this purpose. See U.S. Pat. No. 7,170,670.

C. Encapsulation

Capsules containing electrophoretic media may be of any size or shape. The capsules may, for example, be spherical and may have diameters in the millimeter range or the micron range, but are preferably from about ten to about a few hundred microns.

Encapsulation of the internal phase may be accomplished in a number of different ways. Numerous suitable procedures for microencapsulation are detailed in both Microencapsulation, Processes and Applications, (I. E. Vandegaer, ed.), Plenum Press, New York, N.Y. (1974) and Gutcho, Microcapsules and Microencapsulation Techniques, Noyes Data Corp., Park Ridge, N.J. (1976). The processes fall into several general categories, all of which can be applied to the present invention: interfacial polymerization, in situ polymerization, physical processes, such as coextrusion and other phase separation processes, in-liquid curing, and simple/complex coacervation. In the context of the present invention, one skilled in the art will select an encapsulation procedure and wall material based on the desired capsule properties. These properties include the distribution of capsule radii; electrical, mechanical, diffusion, and optical properties of the capsule wall; and chemical compatibility with the internal phase of the capsule.

The capsule wall generally has a high electrical resistivity. Although it is possible to use walls with relatively low resistivities, this may limit performance in requiring relatively higher addressing voltages. The capsule wall should also be mechanically strong (although if the finished capsules are to be dispersed in a curable polymeric binder for coating, mechanical strength is not as critical). The capsule wall should generally not be porous. If, however, it is desired to use an encapsulation procedure that produces porous capsules, these can be overcoated in a post-processing step (i.e., a second encapsulation), Moreover, if the capsules are to be dispersed in a curable binder, the binder will serve to close the pores. The capsule walls should be optically clear. The wall material may, however, be chosen to match the refractive index of the internal phase of the capsule (i.e., the suspending fluid) or a binder in which the capsules are to be dispersed. For some applications (e.g., interposition between two fixed electrodes), monodispersed capsule radii are desirable.

An encapsulation technique that is suited to the present invention involves a polymerization between urea and formaldehyde in an aqueous phase of an oil/water emulsion in the presence of a negatively charged, carboxyl-substituted, linear hydrocarbon polyelectrolyte material. The resulting capsule wall is a urea/formaldehyde copolymer, which discretely encloses the internal phase. The capsule is clear, mechanically strong, and has good resistivity properties.

The related technique of in situ polymerization utilizes an oil/water emulsion, which is formed by dispersing the electrophoretic fluid (i.e., the dielectric liquid containing a suspension of the pigment particles) in an aqueous environment. The monomers polymerize to form a. polymer with higher affinity for the internal phase than for the aqueous phase, thus condensing around the emulsified oily droplets. In one in situ polymerization process, urea and formaldehyde condense in the presence of poly(acrylic acid) (see, e.g., U.S. Pat. No. 4,001,140). In other processes, described in U.S. Pat. No. 4,273,672, any of a variety of cross-linking agents borne in aqueous solution is deposited around microscopic oil droplets. Such cross-linking agents include aldehydes, especially formaldehyde, glyoxal, or glutaraldehyde; alum; zirconium salts; and polyisocyanates.

The coacervation approach also utilizes an oil/water emulsion. One or more colloids are coacervated (i.e., agglomerated) out of the aqueous phase and deposited as shells around the oily droplets through control of temperature, pH and/or relative concentrations, thereby creating the microcapsule. Materials suitable for coacervation include gelatins and gum arabic. See, e.g., U.S. Pat. No. 2,800,457.

The interfacial polymerization approach relies on the presence of an oil-soluble monomers in the electrophoretic composition, which once again is present as an emulsion in an aqueous phase. The monomers in the minute hydrophobic droplets react with a monomer introduced into the aqueous phase, polymerizing at the interface between the droplets and the surrounding aqueous medium and forming shells around the droplets. Although the resulting walls are relatively thin and may be permeable, this process does not require the elevated temperatures characteristic of some other processes, and therefore affords greater flexibility in terms of choosing the dielectric liquid.

As explained above, alternative techniques may include filling and sealing the dispersions according to the various embodiments of the present invention into a plurality of microcells formed in a polymeric film or incorporating the dispersions in a polymer dispersed film.

D. Binder Material

Capsules produced may be dispersed into a curable carrier, such as a binder material, resulting in an ink which may be printed or coated on large and arbitrarily shaped or curved surfaces using conventional printing and coating techniques. The binder typically is used as an adhesive medium that supports and protects the capsules, as well as binds the electrode materials to the capsule dispersion. A binder can be non-conducting, semiconductive, or conductive. Binders are available in many forms and chemical types. Among these are water-soluble polymers, water-borne polymers, oil-soluble polymers, thermoset and thermoplastic polymers, and radiation-cured polymers.

Coating aids can be used to improve the uniformity and quality of the coated or printed electrophoretic ink material. Wetting agents are typically added to adjust the interfacial tension at the coating/substrate interface and to adjust the liquid/air surface tension. Wetting agents include, but are not limited to, anionic and cationic surfactants, and nonionic species, such as silicone or fluoropolymer-based materials. Dispersing agents may be used to modify the interfacial tension between the capsules and binder, providing control over flocculation and particle settling.

Surface tension modifiers can be added to adjust the air/ink interfacial tension. Polysiloxanes are typically used in such an application to improve surface leveling while minimizing other defects within the coating. Antifoams, such as silicone and silicone-free polymeric materials, may be added to enhance the movement of air from within the ink to the surface and to facilitate the rupture of bubbles at the coating surface. Stabilizers such as UV-absorbers and antioxidants may also be added to improve the lifetime of the ink.

Like other encapsulated electrophoretic displays, the encapsulated electrophoretic displays of the present invention provide flexible, reflective displays that can be manufactured easily and consume little power (or no power in the case of bistable displays in certain states). Such displays, therefore, can be incorporated into a variety of applications and can take on many forms. Once the electric field is removed, the electrophoretic particles can be generally stable. Additionally, providing a subsequent electric charge can alter a prior configuration of particles. Such displays may include, for example, a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. Alternatively or in addition, the particles may have a refractive index that substantially matches the refractive index of the suspending fluid.

EXAMPLES

The following Examples are now given, though by way of illustration only, to show details of particularly preferred reagents, conditions and techniques used to make electrophoretic media according to various embodiments of the present invention.

Preparation of Samples

In a 1 L plastic bottle, 300 g of DuPont R-794 titania, surface functionalized with 3-(trimethoxysilyl) propyl methacrylate (Dow Z-6030) was dispersed in 290.0 g of toluene, then monomers were added to the pigment toluene mixture according to the desired amount. The monomers were in a total amount of 0.912 moles of precursor divided between lauryl methacrylate and one of either 4-chlorostyrene, 4-bromostyrene, 4-fluorostyrene, and pentafluorostyrene, as well as a sample prepared with styrene monomer, to yield desired molar concentrations (1, 2, and 5) molar % of each styrenic monomer.

The pigment and monomers mixture was added to a 1 L jacketed glass reactor, and the reactor was purged with nitrogen, and heated to 65° C. while being mixed vigorously. A free-radical initiator, 2.00 g of 2,2'-azobis(2-methylpropionitrile) (AIBN, Aldrich), previously dissolved in 43 g of toluene, was added dropwise over 15 minutes. The first step of polymerization was heated at 65° C. under nitrogen for 60 minutes after AIBN addition. The lauryl methacrylate was then metered in over 30 minutes for the second step of polymerization. After the addition of lauryl methacrylate, the vessel was heated under nitrogen for 8 hours with continuous agitation at 65° C. The vessel was then exposed to the atmosphere. The mixture was then split into three 1 L plastic bottles, and approximately 500 mL of toluene was added to each bottle. The bottles were mixed vigorously. The pigment was isolated by centrifugation at 3500 rpm for 20 minutes. The supernatant was discarded, and the pigment was washed twice by adding approximately 500 mL of toluene to each bottle, stirring vigorously to disperse pigment, and centrifuging at 3500 rpm for 20 minutes. The pigment was dried in convection oven at 90° C. overnight.

Analysis of Samples

Thermogravimetric analysis (TGA) was performed on the coated pigment particles both before and after samples were washed with THF (wash TGA). The wash TGA is an indication of polymer grafted on white pigment particles, which are from 6.8% to 7.8% by weight. Zeta potential (ZP) measurements were performed using a Colloidal Dynamics ZetaProbe on samples dispersed in Isopar E with surfactant (Solsperse 17000).

As shown in the table of FIG. 4, all pigments with halo styrene co-monomer units resulted with Zeta potentials significantly more negative than that of the reference pigment. FIG. 1 also illustrates as a higher amount of halo styrene co-monomer was used, the resulted pigment had more negative Zeta potential value. Monomers with more fluoro groups, i.e. 2,3,4,5,6-pentafluorostyene, did not have more of an effect on the Zeta potential of the white pigment.

Dispersions were prepared by combining samples of the white pigments with black pigments in a hydrocarbon solvent. The dispersions were encapsulated in gelatin/acacia microcapsules that were then mixed with a polymeric binder to produce a slurry. The slurry was bar-coated onto an indium tin oxide (ITO)-coated polymeric film and dried. The resultant sheet was cut into pieces. Separately, a release sheet was coated with a layer of custom polyurethane lamination adhesive doped with tetrabutylammonium hexafluorophosphate, and cut to a size slightly smaller than the microcapsule/polymer film pieces. The films coated with the microcapsules were laminated to the coated release sheets. In a final step, the release sheet was removed, and the adhesive side laminated to a 2 inch (51 mm) square polymer film bearing a conductive layer to produce single pixel displays to which electrical connections were applied.

Electro-optical measurements of the single pixel displays were obtained using a photopically corrected photo-diode. In these tests, the displays were repeatedly driven to their black and white extreme optical states using 240 millisecond 15 V pulses, then driven to either their black or white extreme optical state. The reflectivity of the optical state was measured for 20 millisecond intervals from the end of the drive pulse for a period of 5 minutes. The reflectivity values were then used to calculate L* for the white state (WS) and dark state (DS) of the samples, where L* has the usual CIE definition: $L^*=116(R/R_0)^{1/3}-16$, where R is the reflectance and $R_0$ is a standard reflectance value. The white state L* values over the 5 minute period were plotted and are provided in FIGS. 2A to 2E and FIGS. 3A to 3E. In addition, a dynamic range ("DR") was calculated equal to the difference between the WS and DS L* values calculated from the reflectivity values recorded at thirty seconds after the end of the drive pulse, as well as a contrast ratio ("CR") equal to the ratio of the reflectivity of the white state to the dark state at the thirty second state. The 5 minute image stability was determined by calculating a WS range and DS range equal to the difference between the maximum and minimum L* calculated from the reflectivity measurements acquired during the 5 minute period. The results are provided in the tables of FIGS. 5 and 6.

Referring to FIGS. 5 and 6, all pigments exhibited similar 30s WS/DS values, but the control samples prepared with 1% 2,2,2-trifluoroethyl methacrylate (TFEM) co-monomer exhibited a high range for both 5 min. WS and DS ranges, unlike the particles having a polymeric coating prepared with 1% halogen substituted and unsubstituted styrene. Thus, the polymers made according to the various embodiments of the present invention provide a method of increasing the Zeta potential of the electrophoretic particles without adversely impacting the image stability of the displays in which the particles have been incorporated.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The contents of all of the aforementioned patents, applications, and publications are incorporated by reference herein in their entireties. In the event of any inconsistency between the content of this application and any of the patents and applications incorporated by reference herein, the content of this application shall control to the extent necessary to resolve such inconsistency.

We claim:

1. An electrophoretic medium comprising a suspending fluid, a plurality of a first type of positively charged electrophoretic particles, and a plurality of a second type of negatively charged electrophoretic particles, each electrophoretic particle of the plurality of the second type of electrophoretic particles comprising a pigment particle having an intermediate residue covalently bonded to the surface of the pigment particle and a polymer covalently bonded to the intermediate residue, wherein the polymer is derived from one or more monomers and at least one of the monomers is a styrenic monomer having a phenyl group according to Formula I:

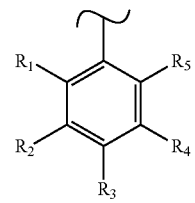

(Formula I)

wherein at least one of $R_1$, $R_2$, $R_3$, $R_4$, and $R_5$ is a halogen, wherein the zeta potential of the second type of electrophoretic particle is more negative than the zeta potential of the pigment particle.

2. The electrophoretic medium according to claim 1, wherein the styrenic monomer is selected from the group consisting of 4-fluorostyrene, 2-fluorostyrene, 4-chlorostyrene, 2-chlorostyrene, 4-bromostyrene, 2-bromo-styrene, 4-iodostyrene, 2-iodostyrene, and combinations thereof.

3. The electrophoretic medium according to claim 1, wherein the polymer comprises about 1 to about 15 percent by weight of the electrophoretic particle.

4. The electrophoretic medium according to claim 1 wherein the pigment particle of the plurality of the second type of electrophoretic particles comprises a metal oxide or hydroxide.

5. The electrophoretic medium according to claim 4 wherein the pigment particles comprises titania.

6. The electrophoretic medium according to claim 5, wherein the titania is coated with silica.

7. The electrophoretic medium according to claim 1, wherein the intermediate residue is derived from a silane.

8. The electrophoretic medium according to claim 7, wherein the silane is selected from the group consisting of 3-(trimethoxysilyl) propyl acrylate, 3-(trimethoxysilyl) propyl methacrylate, and combinations thereof.

9. The electrophoretic medium according to claim 1 wherein the one or more monomers further comprise one or more of an acrylate, a methacrylate, a halogen substituted acrylate, and a halogen substituted methacrylate.

10. The electrophoretic medium according to claim 9 wherein the one or more monomers comprise one or more of 2-ethylhexyl methacrylate, methyl methacrylate, isobutyl methacrylate, t-butyl methacrylate, lauryl methacrylate, isobornyl methacrylate, 2-ethylhexyl acrylate, t-butyl acrylate, 2,2,3,4,4,4-hexafluoro butyl acrylate, 2,2,2-trifluoroethyl methacrylate, and 3,3,4,4,5,5,6,6,7,7,8,8-tridecafluorooctyl acrylate, 2-fluoroethyl methacrylate, 2-fluoroethyl acrylate, 2-chloroethyl methacrylate, 2-chloroethyl acrylate, 2-bromoethyl methacrylate, and 2-bromoethyl acrylate.

11. An electro-optic display comprising the electrophoretic medium according to claim 1 and at least one electrode arranged adjacent the medium and capable of applying an electric field to the medium.

12. The electrophoretic medium according to claim 1, further comprising a charge control agent.

* * * * *